United States Patent Office 3,357,340
Patented Dec. 12, 1967

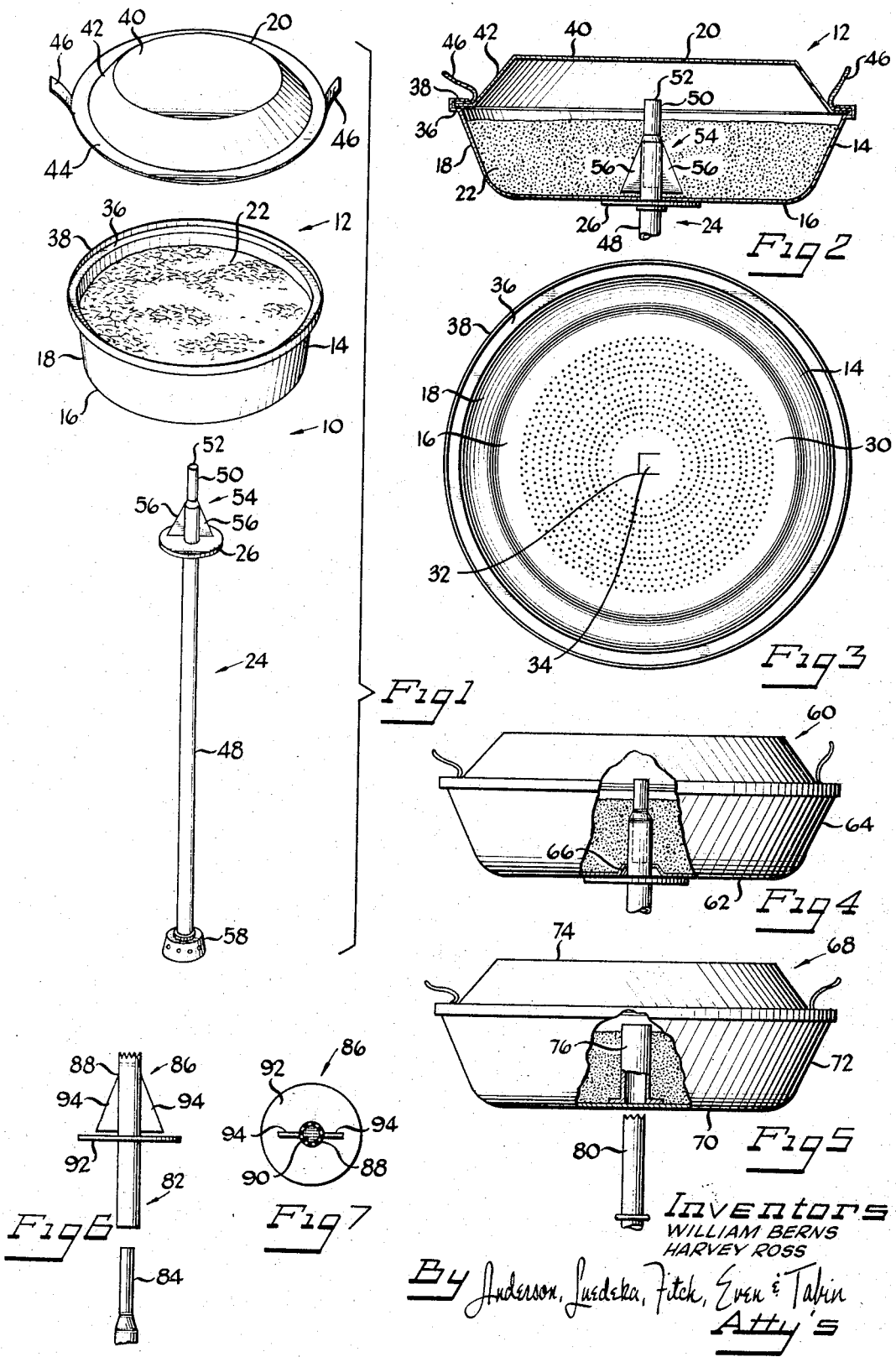

3,357,340
COFFEE BREWING APPARATUS
William Berns, 4800 Chicago Beach Drive, Chicago, Ill. 60615, and Harvey Ross, 8534 Belmar, Northridge, Calif. 91324
Filed Dec. 8, 1964, Ser. No. 416,869
6 Claims. (Cl. 99—295)

This invention relates to coffeemakers in which coffee is prepared by the percolator method and, more specifically, is directed to a disposable coffee basket and cooperative stem particularly adapted to be employed in conjunction with the percolator method.

The traditional coffee percolator includes a hollow vessel adapted to receive a quantity of water. A perforated basket containing a quantity of ground roasted bean is supported within the vessel adjacent the upper end of a hollow stem which extends upwardly through and projects above and through a perforated lid of the container. The water, as it is boiled, rises in surges or bursts through the stem, and then flows downwardly through the perforations in the lid and over the coffee in the basket.

It will be appreciated that after each batch of coffee is brewed and prior to the brewing of a subsequent batch, the used coffee bean or grounds must be removed from the basket, the basket must be cleaned, and a supply of fresh ground bean added. Cleaning of the basket of a standard percolator-type coffeemaker is generally a messy and unpleasant job; however, an improperly cleaned basket will adversely affect the taste of the coffee produced. In offices and other business establishments, therefore, in which freshly brewed coffee is provided as a convenience to employees and customers, a significant portion of the time of certain of the personnel must be spent in cleaning and maintaining the coffee brewing equipment, thus making the overall expense of this service quite high.

To overcome this problem, single-use disposable coffee packages have been devised. Such a disposable package is shown, for example, in the U.S. patent to Gauld, No. 3,119,694. The disposable unit disclosed in that patent includes a basket having an integral, centrally disposed, upwardly extending sleeve to receive the upper end of the stem of the coffeemaker, and also includes a filter sheet and means for holding the filter sheet in overlying relation to the bottom wall of the basket and over the upper end of the central sleeve. The entire basket unit is thrown away after one use.

While the Gauld arrangement is relatively simple and convenient, the incorporation of structures such as an integral central sleeve, a built-in filter sheet, and means for holding the filter sheet in place, add to the cost of each of the disposable units or packages. Further, since the unit or package, as disclosed in that patent, includes a large central opening covered only by the porous filter sheet, it is necessary to provide separate individual sealed outer packages or containers such as a plastic bag for each of the basket units, further adding to the cost per unit.

The principal objects of the present invention are to provide an improved percolator-type coffee brewing apparatus; to provide an extremely simple and low-cost, single-use disposable basket for packaging, brewing and disposing of ground coffee beans utilized in the preparation of coffee beverages; to provide a stem adapted to cooperate with a disposable coffee basket and which may be utilized for subsequent brewings; to provide a disposable coffee basket having improved brewing characteristics; to provide an improved stem which may be detachably secured to a disposable coffee basket for co-operation therewith; to provide a disposable coffee basket having improved means of insertion and removal from the coffeemaker; and to provide a disposable coffee basket having improved storage characteristics, economy of manufacture and efficiency.

Other objects and advantages will become apparent after consideration of the accompanying description and drawings.

In the drawings:
FIGURE 1 is a vertically exploded perspective view showing various features of the invention;
FIGURE 2 is an enlarged central sectional view of a portion of the structure of FIGURE 1 when in an assembled condition;
FIGURE 3 is an enlarged top view of a component of the structure shown in FIGURE 1;
FIGURE 4 is an enlarged fragmentary view of an alternate embodiment of the structure as seen in FIGURE 2;
FIGURE 5 is an enlarged fragmentary view of an alternate embodiment of the structure as seen in FIGURE 2;
FIGURE 6 is an enlarged front view of an alternate embodiment of a component of the structure shown in FIGURE 1; and
FIGURE 7 is a top view of the component shown in FIGURE 6.

The improved coffee basket of the present invention is adapted to be utilized in conjunction with a vessel (not shown) of a conventional percolator-type coffeemaker. Such vessels generally provide a heating element located at their base and are usually supplied with an upright stem, the lower end of which is in thermal contact with the heating element. A coffee percolator with which the invention may be utilized is similar to that shown in Patent 2,224,409, issued Dec. 10, 1940.

Very generally, there is illustrated in the drawing a coffee-making apparatus 10 which includes a low-cost single use disposable coffee package 12 in the form of a basket 14 having a perforated bottom wall 16, side walls 18 and a lid 20. The package 12 contains a quantity 22 of ground coffee bean and is adapted to be furnished to the consumer or user in a closed condition and to remain in essentially such condition before, during and after use.

The basket 14 is supported within the vessel by means of a hollow stem 24 which is caused to project through the bottom wall 16 and thus constitutes the means by which boiling liquid is introduced into the basket. A disk 26 encircles the stem and serves as a platform upon which the basket rests.

Now considering the coffee-making apparatus 10 in further detail, the basket 14 of the illustrated package 12 is in the form of an upwardly open generally cylindrical cup or receptacle which is preferably constructed of a relatively inexpensive lightweight liquid-impermeable material such as a metal foil. The bottom wall 16 of the basket is of a generally circular configuration and is provided with a plurality of small holes or perforations 30 which are spaced over its entire area (FIG. 3). These openings or perforations are sufficiently small to prevent ground pieces of coffee bean from passing through them, but are sufficiently large to permit the passage of liquid therethrough.

As was previously mentioned, the stem 24 is intended to be caused to project through the bottom wall 16 of the basket 14 to permit boiling liquid to be introduced into the package 12. To facilitate the entry of the stem into the basket, the bottom wall is provided with a centrally located cut line 32 which can be, for example, U-shaped or C-shaped and which defines a flap 34 which can be easily folded back under presure applied through the stem.

The side wall 18 of the basket 14 is integral with the bottom 16 and extends upwardly therefrom. The upper edge of the side wall is offset outwardly to provide an annular ledge or shoulder 36 and a lip 38 extending from the outer edge thereof. The shoulder 36 supports the peripheral edge of the lid 20 when the basket is assembled, as shown best in FIGURE 2. The lip 38 is folded over the peripheral portion of the upper surface of the lid to retain the latter in place after the ground coffee bean has been placed in the basket.

The lid or cover 20, as illustrated, is of a generally circular configuration and is formed of a semi-rigid material similar to the basket material such as, for example, metal foil or heat-resistant plastic. The central portion of the lid is fashioned in a dome-like manner, as illustrated in FIGURES 1 and 2 so as to include a top wall 40 and side wall 42. A flange 44 encircles the side wall and is adapted to rest upon the shoulder 36 of the basket 14 when the package is assembled (FIG. 2). The folding of the lip 38 of the basket over the flange 44 retains the lid in place.

The domed shape of the lid causes liquid which rises in the stem 24 and impinges upon the lid to be dispersed over essentially the entire upper surface of the coffee 22. Thus, the shape of the lid facilitates a more thorough brewing of the coffee.

In the placing of the package 12 in the vessel of the percolator, the diameter of the basket may frequently closely approximate the inner diameter of the vessel, thus making manipulation of the package difficult. Also, when it is desired to remove the package from the vessel, as after the coffee has been brewed, the package is often quite hot and thus difficult to handle. To facilitate insertion and removal of the package from the vessel, tab members 46 are provided adjacent diametrically opposite sides of the package and project outwardly for easy grasping. These tabs are preferably constructed of a non-conductive material and may be independent of or integral with the lid. When constructed separately, the tab portions may be inserted into the basket as the lid is positioned in place and secured by the lid 20 as the lip 38 of the basket is folded over the peripheral portion of the flange 44 of the lid. Thus the lip 38 retains both the lid 20 and tabs 46 in place.

A sufficient quantity 22 of granular coffee is provided within the basket 14 to permit the brewing of the desired number of cups of liquid coffee. The size of the basket 14 relative to the amount of coffee being used is such that the ground coffee bean fills approximately the lower half of the basket 14 leaving a substantial space or area between the coffee and the upper surface or top wall 40 of the lid 20. This space permits the movement and dispersal of liquid within the package. Baskets of several different sizes may be provided, each being adapted to contain a given amount of coffee, or a relatively large basket may be provided which can contain a large amount of coffee or lesser amounts. Obviously, the choice will depend upon the circumstances surrounding the use of the package. However, it is contemplated that the packages will be furnished to the customer with a given amount of coffee contained therein and it is not necessary for the customer to measure the various amounts of coffee needed in the use of the package.

The stem 24 is intended to be reusable, i.e., it is intended that a single stem be utilized with successive packages and that it be merely withdrawn from an exhausted package and inserted into a fresh one. In the embodiment of the invention shown in FIGURE 1, the stem is preferably constructed of aluminum or copper tubing and includes a lower portion 48 and an upper portion 50 having an outer diameter smaller than that of the inner diameter of the lower portion 48 so as to permit it to telescope within the lower portion, wherein it is secured, as by crimping, soldering or other suitable means. The upper edge of the lower portion 50 is tapered, as at 52, to provide a wedge which facilitates the entry of the stem through the lower wall of the basket and reduces the tolerance between the tube and the basket wall when the tube is in place.

The disk 26 upon which the basket 14 is supported is generally annular in shape and is secured about the lower portion 50 of the stem slightly below the upper edge thereof. The disk 26 engages the underside of the bottom wall 16 when the basket is assembled on the stem and thereby provides vertical support for the package. Preferably, the disk is spaced downwardly from the upper edge of the stem a sufficient distance to cause the upper end of the stem to be positioned just above the level of the coffee within the basket but spaced a substantial distance from the under surface of the lid 20.

In the placing of the package and stem into the vessel, it is desirable that the stem be temporarily attached to the basket to facilitate positioning of the lower end of the stem, as will become more apparent shortly. Accordingly, a securing means 54 is provided at the upper end of the stem and, in the illustrated embodiment, comprises a pair of diametrically opposed, radially projecting leaves 56 which commence in spaced relation to the upper surface of the disk 26 and taper inwardly and upwardly. The leaves easily penetrate the bottom wall 16 of the basket but if, after the adapter has been inserted, the stem is given a half turn, the leaves are no longer aligned with the openings which they formed when the stem was inserted and thus secure the stem to the basket.

The stem is integrally connected at its lower end to a base 58 in the form of an inverted cup which rests upon the bottom of the coffee-making vessel (not shown), preferably in communication with a cavity in intimate thermal contact with the heating unit of the vessel. In certain constructions, the base is provided with a plurality of holes to permit liquid to pass into the aforementioned cavity and thence upwardly through the stem to the basket.

In the use of the apparatus 10, a coffee package 12 is joined with a stem 24, preferably by placing the package in an inverted or upside-down position and inserting the upper end of the stem through the bottom wall 16 of the basket 14 until disk 26 abuts the outer surface of the bottom wall. During this insertion, the flap 34 is deflected to an out of the way adapter position. The stem is then given one-half turn to engage the leaves 56 with the lower wall of the basket. The package is again inverted, placing the stem in a depending position relative to the basket, where it is retained by the leaves. While the basket is grasped by the tabs 46, the lower end or base 58 of the stem is positioned within the cavity of the vessel.

In the operation of the apparatus 10 in conjunction with the vessel of a conventional percolator, boiling liquid rises in the stem 24 and engages the underside of the lid 20, the dome-like shape of the lid causing the liquid to be spread or dispersed over the coffee 22 within the basket. The liquid filters down through the ground coffee and through the perforations 30 in the bottom wall of the basket and back into the body of liquid in the lower portion of the coffee making vessel, from which it again enters the stem. The cycle is repeated until the liquid has acquired the desired taste and aroma.

After the liquid coffee has been made or brewed, the package 12 and the stem 24 are removed as a unit from the coffee making vessel by means of the tabs 46 and the package is discarded.

Instead of securing the stem 24 to the basket 14 before the basket is inserted into the vessel, it may be desirable to place the stem in the vessel first and subsequently position the basket with respect thereto. In an alternate embodiment of the invention shown in FIGURE 4, a basket 60 is provided which includes a bottom wall 62 and a side wall 64. The bottom wall is provided with a cut line (not shown) similar to cut line 32 of the embodiment of FIGURES 1–3. The bottom wall is provided with a centrally located indentation 66. The cavity or indentation 66 makes it possible to determine when the cut line in the bottom of the basket is properly positioned with respect to the upper end of the stem so that after the stem is aligned with the cavity the basket may be forced downward causing the stem to enter the bottom wall of the basket.

FIGURE 5 illustrates another embodiment which includes a basket 68 having a perforated bottom wall 70, a generally cylindrical side wall 72 and a lid 74 which is not shown but which is similar to the lid 20 of the principal embodiment. The basket is provided with a built-in sleeve 76 which is secured to the bottom wall 70 generally centrally thereof and extends upwardly so as to locate its upper end above the level of the coffee in the basket. The bottom wall is provided with a line of weakness rather than a cut line, as in the previous embodiments, and is adapted to be ruptured by the serrated or upper end of a stem 80.

A further embodiment of this invention is illustrated in FIGURES 6 and 7 wherein a stem 82 is constructed of two cooperative units in the form of a conventional percolator stem 84 and an adapter 86. The adapter includes a tube 88 having its upper edge serrated to facilitate rupturing the bottom wall of the basket, as when the bottom wall is provided with a line of weakness rather than a flap. Slightly below the serrations is located a strainer or filter screen 90 secured across the passageway within the tube to prevent coffee grounds from entering therein during operation. The adapter is provided with a disk 92 and leaves 94 of similar construction to the disk and leaves illustrated in the embodiment of FIGURE 1. The lower end of the adapter is adapted to telscopically cooperate with the upper end of a conventional coffee stem provided with most coffee percolators. In use, the adapter is secured to the basket. The basket is held with the adapter depending and the adapter and stem are caused to telescope together within the percolator vessel.

An improved coffee making apparatus has thus been provided in which a disposable coffee basket having improved brewing characteristics is detachably secured to a percolator stem for use in a conventional percolator vessel.

What is claimed is:

1. For use with the vessel of a percolator-type coffeemaker providing a heating means, a coffee-containing basket having a lower wall of readily deformable material, a stem comprising a hollow elongated tube having a first end adapted to be inserted into said basket and having a second end adapted to be placed adjacent said heating means, means facilitating the penetration of said tube through the lower wall of said basket, a support means associated with said tube intermediate its ends for engaging the undersurface of said basket, and projections extending outwardly from the wall of said tube between said support means and said first end for detachably securing same to said basket after said projections have been passed through the lower wall of said basket.

2. A closed, walled basket adapted to hold a quantity of granular coffee to provide a single-use, disposable coffee package for use with the vessel of a percolator-type coffeemaker, said basket comprising a side wall, a generally horizontal flat continuous readily pierceable perforated lower wall through which a hollow stem may be easily inserted to convey boiling liquid into said basket, a dome-shaped lid for said basket positioned so as to be contacted by liquid entering said basket through said stem and adapted to disperse said liquid over the surface of the coffee in the basket, and tabs projecting from said basket adjacent the upper portion thereof to facilitate insertion and removal of same into and out of the vessel.

3. A coffee brewing apparatus comprising a basket having a perforated bottom wall and a lid spaced from said bottom wall, said basket containing a quantity of ground coffee bean, and an elongated hollow tubular member having an upper edge formed so as to facilitate the puncturing of said bottom wall by insertion of said tubular member through said bottom wall, a disk secured to said tubular member intermediate its ends to provide a platform for supporting said basket and to limit the extent of movement of said tubular member through said bottom wall so as to position the upper edge thereof above the level of the ground coffee bean in said basket, and a screen affixed within and extending across the hollow of said tubular member so as to prevent ground coffee bean from passing downwardly through said member.

4. For use with the vessel of a percolator-type coffeemaker providing a heating means, a walled basket adapted to hold a quantity of granular coffee, said basket having a perforated lower wall formed of readily pierceable material, tabs projecting from said basket adjacent the upper portion thereof to facilitate insertion and removal of said basket into and out of the vessel, an elongated hollow tubular member having an upper end adapted to be inserted through the lower wall of said basket, means on said tubular member for supporting said basket and for limiting the extent of movement of said tubular member through said lower wall, and projections extending outwardly from the wall of said tubular member intermediate said support means and said upper end for detachably securing said tubular member to said basket after said projections have been passed through the lower wall of said basket.

5. The combination in accordance with claim 1, wherein said hollow elongated tube comprises an upper section and a lower section telescopically arranged, said upper section including said support means and said projections.

6. The combination in accordance with claim 1, wherein the lower wall of said basket includes an opening for receiving the upper end of said tube, said opening being closed by a displaceable portion of said bottom wall to prevent coffee from passing therethrough prior to insertion of said tube.

References Cited
UNITED STATES PATENTS

| | | | |
|---|---|---|---|
| 832,045 | 10/1906 | Dowling | 99—312 |
| 1,377,316 | 5/1921 | Clermont | 99—306 |
| 2,020,104 | 11/1935 | Collin | 99—311 |
| 2,109,624 | 3/1938 | Ramstedt | 99—311 |
| 2,738,990 | 3/1956 | Hill. | |
| 2,859,684 | 11/1958 | Polizzi | 99—312 |
| 2,889,049 | 6/1959 | Hauser. | |
| 2,948,212 | 8/1960 | Sisselman et al. | 99—310 |
| 3,083,100 | 3/1963 | Baran | 99—77.1 |
| 3,095,801 | 7/1963 | Fogg | 99—312 |
| 3,119,694 | 1/1964 | Gauld | 99—77.1 |

WALTER A. SCHEEL, *Primary Examiner.*

S. P. FISHER, *Assistant Examiner.*